UNITED STATES PATENT OFFICE.

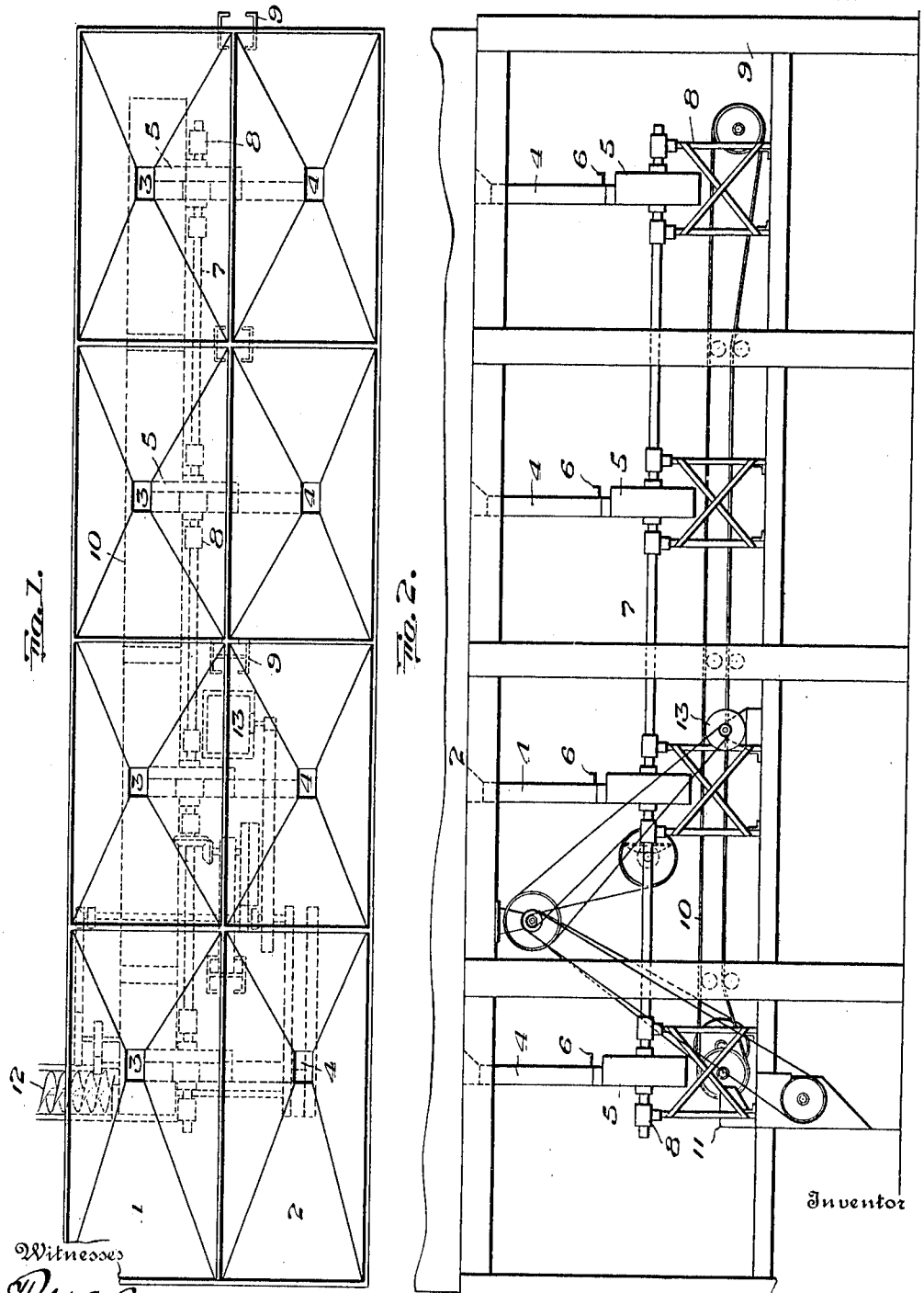

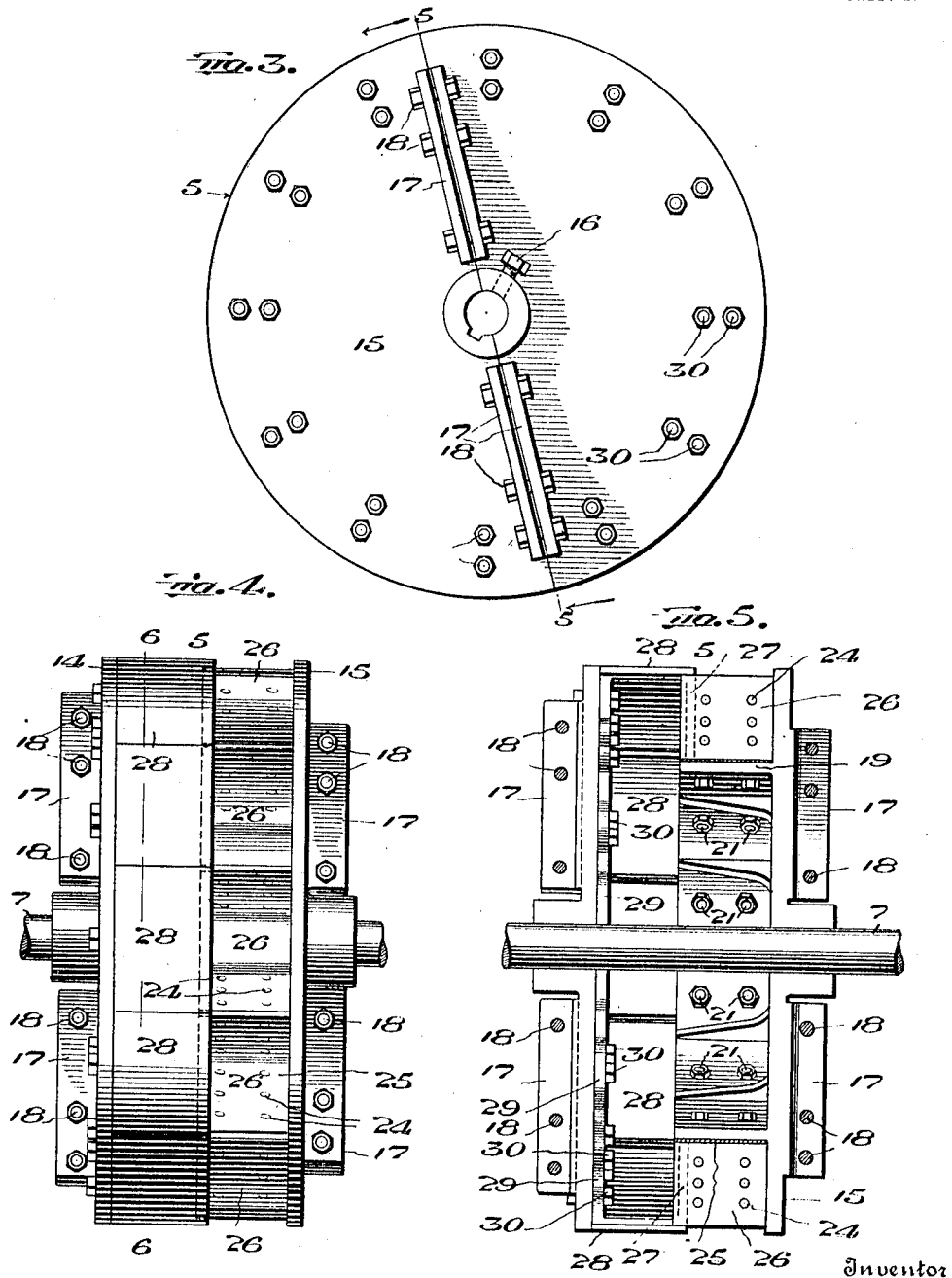

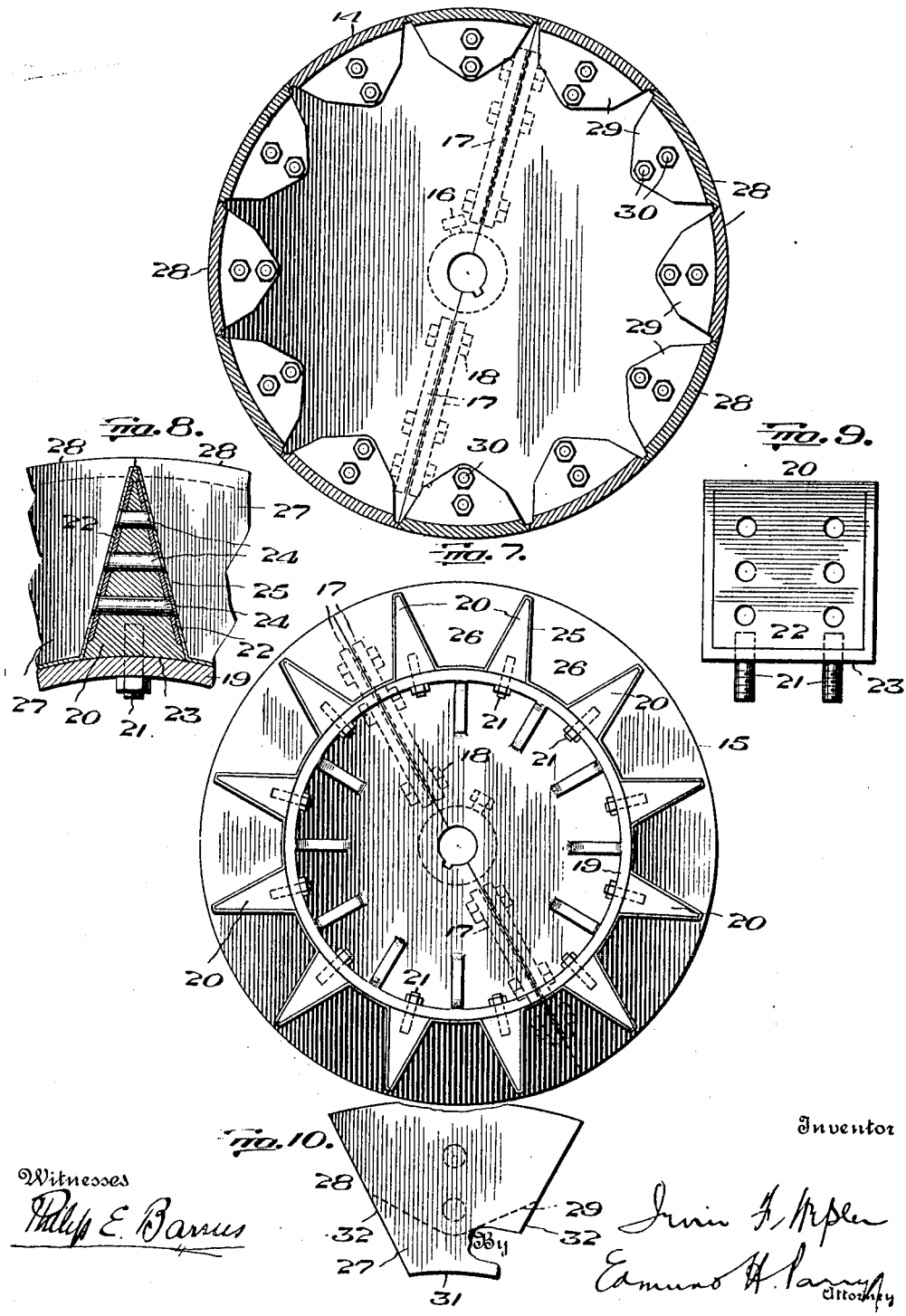

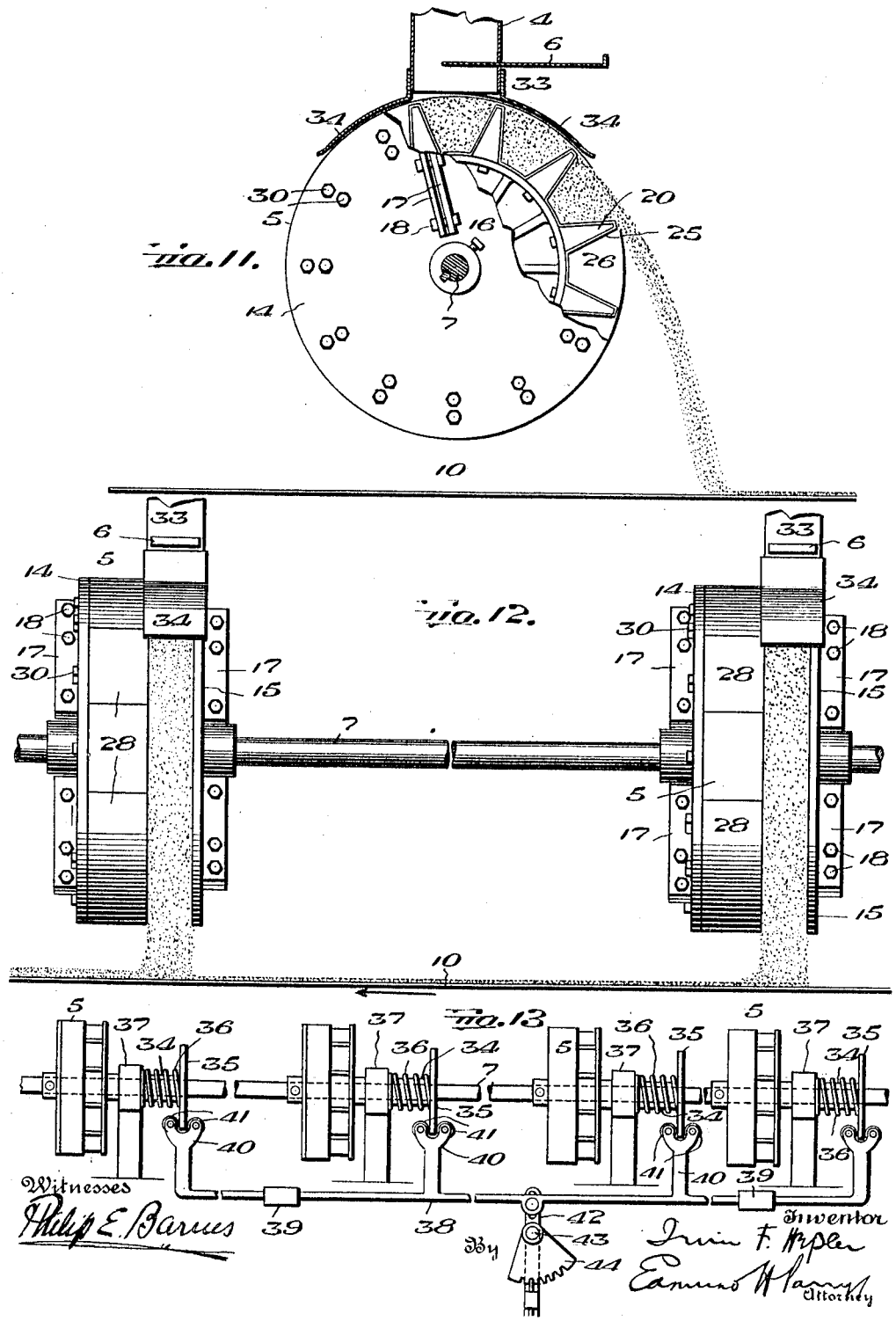

IRVIN F. HEPLER, OF NARBERTH, PENNSYLVANIA, ASSIGNOR TO GENERAL REFRACTORIES COMPANY, OF NEW YORK, N. Y., A CORPORATION OF WEST VIRGINIA.

MEASURING AND MIXING APPARATUS.

1,313,892.  Specification of Letters Patent.  Patented Aug. 26, 1919.

Application filed June 30, 1917. Serial No. 177,866.

*To all whom it may concern:*

Be it known that I, IRVIN F. HEPLER, a citizen of the United States, residing at Narberth, in the county of Montgomery and State of Pennsylvania, have invented certain new and useful Improvements in Measuring and Mixing Apparatus, of which the following is a specification, reference being had therein to the accompanying drawing.

This invention comprises an apparatus for measuring and mixing various materials.

While it is capable of general application, the invention is especially designed for use in the storing, measuring, mixing and handling of ingredients used in the manufacture of firebrick and other refractory products. There are problems presented in this particular art which are not encountered where coarser materials are used and where less accuracy is required in the proportioning of the component ingredients. The materials are frequently of such a nature and comminuted to such a degree as to require absolute accuracy of fit between the parts of the apparatus intended to handle them. It is very desirable to provide for changing the proportions of the ingredients and to effect this quickly without dismantling portions of the apparatus or substituting certain parts. The present invention avoids the use of blocks or insert-members to vary the size of pockets, as these are undesirable. They frequently become loose and fall out and, in addition to the fact that they require considerable time for their adjustment, they do not lend themselves especially to accuracy of measurement.

The several ingredients have to be very intimately mixed, in addition to being accurately proportioned, in order to insure a perfect resulting product. As it is frequently several days after the mixing that the resulting product can be examined—during which time in a large plant a vast amount of finished product is being turned out—the necessity for initial accuracy of measurement and elimination of mistakes in the proportioning will be apparent.

The present invention contemplates, among other objects, an improved apparatus for handling the ingredients whereby the desired results are attained economically and accurately. Other objects and advantages will be in part apparent and will, in part, be brought out in the description which follows.

In order that the invention may more readily be comprehended, drawings are hereto appended which disclose a preferred form of apparatus, though it is to be understood that these drawings are merely illustrative and that the invention may be considerably varied without departing from its spirit.

In these drawings:

Figure 1 is a view in top plan, more or less diagrammatic, of one arrangement of the apparatus;

Fig. 2 is a fragmentary view of the same in side elevation;

Fig. 3 is a view in end elevation of a measuring wheel which constitutes a component of the apparatus;

Fig. 4 is a view in front elevation of the same;

Fig. 5 is a view in transverse section on the line 5—5, Fig. 3;

Fig. 6 is a view in sectional elevation on the line 6—6, Fig. 4;

Fig. 7 is a similar view on the line 7—7, Fig. 4;

Fig. 8 is a detail view in transverse section of a spacer-member forming a part of the measuring wheel;

Fig. 9 is a view in side elevation of the same;

Fig. 10 is a view in end elevation of a pocket-end forming member also constituting a portion of the measuring wheel;

Fig. 11 is a fragmentary view, in sectional elevation, of one of the measuring wheels in operation to deliver materials onto a conveyer;

Fig. 12 is a similar view in elevation of the conveyer and two of the measuring wheels; and Fig. 13 is a view in side elevation of a means for effecting relative movement of several of the disks in unison.

Referring specifically to the drawings, and particularly to Figs. 1 and 2 thereof, the apparatus shown therein comprises a plurality of juxtaposed storage chambers or hoppers 1 and 2 which feed through chutes 3 and 4, respectively, to a series of measuring wheels 5. The feed is regulable in each chute by a feed-controlling member 6, the arrangement being such that the hoppers may be used alternately or together. The proportionate amount of material from each hopper is, therefore, capable of regulation by means of the member 6.

There is provided a measuring-wheel for each set of hoppers. Each wheel is secured to a shaft 7 mounted for rotation in supporting bearings 8 disposed on a framework 9, which may constitute a portion of the hopper-support.

Underneath the wheels there is arranged a traveling conveyer 10, preferably in the form of an endless belt. This travels in the direction of a hopper 11, the arrangement being such that different materials or grades of materials may be fed onto the belt successively, or simultaneously, in the manner presently to be explained. Any desired proportions of these materials may be fed from the hoppers 1 and 2 through the chutes 3 and 4 to the respective measuring-wheels 5 and thence to the belt 10 onto which such materials are deposited, one upon the other; in layers and, by the belt, carried to the hopper 11, whence the materials may be transferred, by suitable means, such as a worm 12, to a place of storage or use.

The hopper 11 is so disposed in relation to the point of discharge of the materials from the belt that, in addition to the aforementioned initial mixing which the materials get while they are being deposited upon and while on the belt 10, they will be further and intimately mixed in falling from the belt into this hopper.

By the foregoing structure may be effected, first, the initial proportioning of the ingredients (which are to constitute the ultimate mass) from the storage chambers; secondly, the measuring of predetermined quantities of the ingredients so proportioned; thirdly, the superposing of the measured and proportioned masses in layers upon a conveyer, such layers then having a definite relation one to another; fourthly, the initial mixing of the materials which constitute the layers; fifthly, the completion of the mixing; and sixthly, the storage of the mixed ingredients ready for use.

The shaft 7, traveling belt 10, and worm 12 are all suitably driven from a driving source 13.

An important component of the apparatus resides in the measuring wheel 5. This comprises, preferably, oppositely-disposed disk or pocket-members 14 and 15 adapted to be splined on the shaft 7 to rotate therewith, but capable of relative longitudinal adjustment thereon, as by means of set-screws 16. These members may be formed in sections having lugs 17 and be secured together as by bolts 18.

The member 15 is provided with a spacer-supporting member or flange 19 arranged on the face thereof in spaced relation to its periphery. Disposed about the flange and in spaced relation to each other is a plurality of spacing members or blocks 20 suitably secured to the flange as by bolts 21. These spacing members are shown in detail in Fig. 8, and preferably comprise side-walls 22 which converge from a base 23 to a point at the outer extremity of the block. The bolt 21 is adapted to pass into the base of the block. Upon its converging faces, there is secured, as by rivets 24, a metal facing strip 25. These blocks, being in spaced relation, form (together with the inner face of the disk 15) the sides, the bottom, and one end of a pocket 26. The other end of the pocket is formed by a depending section 27 of a pocket-end-forming member 28 which, in turn, is provided with a flange 29 suitably secured, by bolts 30, to the disk 14. The end-portion 27 of this pocket-forming member has a base 31 and side-walls 32 which latter converge, the arrangement being such that the end-portion will accurately fill the space between two of the blocks 20 on the disk 15. One of these portions is shown in detail in Fig. 10.

To insure accuracy of fit between the end-portions 27 and the walls forming the sides and bottom of the pockets, the facing-strip 25 is preferably made of soft metal and is carried around the blocks and bottom-portion of the pocket 26. By this arrangement, when the disks 14 and 15 are adjusted toward each other, the end-portions 27 of the pocket-end-forming members will impress their outlines upon the soft metal facing strip 25 to accommodate any irregularities in the faces of the end-portions and, thus, avoid the necessity of very accurate milling or other machining of these parts.

In conjunction with each measuring-wheel there is preferably provided a combined guard and cut-off member 33 which has extensions 34 passing down around a portion of the measuring-wheel. These extensions constitute a cut-off or leveling device to insure an accurate proportion of material entering each pocket as the wheel is rotated beneath this cut-off member 33.

As shown in Figs. 11 and 12, this cut-off also serves the function of holding the material in repose in the pockets until they pass well beyond the center line and will thus be in position to deposit their contents uniformly and in a predetermined position on the conveyer. It also insures accurate and even filling. As one pocket is passing the edge of the cut-off, another will come into register with the filling opening, and any materials scraped or leveled from the surface of the filled pocket will be pushed back against the outgoing materials. This sets up a sort of rotary motion to the materials which prevents clogging in the outlet.

Operation: In the operation of the device, the hoppers are provided with different ingredients which are to constitute the finished product. The initial proportioning of each ingredient is effected by the member 6 arranged in each of the chutes 3 and 4. The ingredients, as thus initially proportioned, are fed to the measuring-wheels 5 to be measured into predetermined quantities. These wheels, being rotated beneath the hopper, deliver the measured and proportioned materials to the traveling belt 10 in superposed layers: The belt travels from right to left (as viewed in Fig. 2) and thus the materials discharged from the measuring wheels will be superposed one upon the other in a fixed and definite proportion which had previously been determined by the regulating member 6, and adjustment of the disks which constitute a portion of each measuring wheel. As there is more or less vibration and movement of the traveling belt, the materials thereon are caused to intermix to a certain extent. This I will call an initial mixing. In discharging from the traveling belt to the hopper, the materials are further and more intimately mixed. From the hopper, they are transferred to the point where they are to be made up into the finished product.

It will be apparent, therefore, that provision is here made for feeding, for example, hard and soft grades of material in fixed proportion to a measuring-wheel; and then there may be a feeding of two entirely different ingredients in suitable proportion to another measuring wheel; and so on, depending upon the number of wheels and hoppers provided. By varying the relation of the disks which constitute parts of each of the several measuring-wheels themselves, the proportion of the hard and soft materials may in turn be varied within almost limitless range with relation to the proportion of the other ingredients which are being discharged from the measuring-wheels upon the traveling belt, and the whole mass arranged in a fixed and definite relation upon the belt, one ingredient disposed upon another in layers.

In addition to the different provisions herein enumerated for accurately proportioning and weighing the various materials, it is sometimes found desirable to effect relative adjustment of several or all of the disks in unison. To this end, means are provided whereby movement of one disk with relation to another will effect a corresponding variation in the measuring capacity of the pockets in each set.

A simple arrangement for effecting this result is disclosed in Fig. 13. The means here shown comprise a plurality of sleeves 34 connected at one end to one of the disk-members of each wheel and having at the opposite end a flange 35. These flanges are normally held at the limit of their outward movement by a spring 36 which bears against a stop 37, and means are provided for effecting movement of the flanges in unison against the action of these springs. Such means as herein shown comprise a rod 38 movably mounted in guides 39 and having co-acting with each flange 35 a spanner 40 provided with rollers 41 in engagement with the flanges. A lever 42 is pivotally mounted intermediate its ends upon a fulcrum 43 and connected at one end to the rod 38. The other end of the lever co-acts, through a detent, with a rack 44 whereby it may be held in various positions of adjustment.

It will be evident that movement of the lever 42 in either direction will effect a movement of the flanges 35 and sleeves 34 and through these effect a corresponding movement of one of the disk-members of each wheel to uniformly vary the size of the pockets.

While the invention has been disclosed in connection with one type of structure, it is to be understood that it is not limited thereto nor to the precise form thereof, since this disclosure contemplates many changes in the construction and arrangement of the parts without departing from the spirit of the invention or sacrificing its chief advantages.

What I claim is:

1. A measuring-device comprising a plurality of juxtaposed disk-members; spacer-members on one disk and forming therewith an open-ended pocket; a pocket-end-forming member disposed on another disk-member whereby the size of the pocket is varied upon movement of the disks toward or away from each other; and a lining of soft material in said pocket in engagement with the end-forming member.

2. A measuring-device comprising juxtaposed disks; a flange disposed on one of said disks; a plurality of spacer-members on said flange and forming, with said flange and disk, open-ended pockets around the periphery thereof; a pocket-end-forming member having a portion filling the space between the spacer-members and a portion secured to the other disk, operable upon movement of the disks toward or away from each other to vary the size of the pocket; and a lining of soft metal in engagement with said pocket-end-forming member within each pocket.

3. A measuring and mixing apparatus comprising a plurality of bins, an outlet chute on each bin, a gate for regulating the amount of flow of material through each chute; a cut off associated with each chute, a measuring wheel associated with each cut off and rotatably mounted in relation to each chute, said wheels being provided with compartments adapted to be filled from the chutes; a traveling conveyer movable in synchronism with the measuring wheels and in a transverse direction thereto whereby materials from the wheels will be superposed upon the conveyer, and a receiving and mixing bin associated with the conveyer and in spaced relation thereto whereby the materials are intimately mixed in passing from the conveyer to the bin.

In testimony whereof I affix my signature in presence of two witnesses.

IRVIN F. HEPLER.

Witnesses:
PARK HITCHINS,
THOMAS K. LEWIS.